(12) United States Patent  
Lee

(10) Patent No.: US 10,732,619 B2  
(45) Date of Patent: Aug. 4, 2020

(54) METHOD FOR MONITORING DRIVING UNIT OF CAR BODY ASSEMBLY LINE, AND DEVICE THEREFOR

(71) Applicant: ITS, Ulsan (KR)

(72) Inventor: Youngkyu Lee, Ulsan (KR)

(73) Assignee: ITS, Ulsan (KR)

( * ) Notice: Subject to any disclaimer, the term of this patent is extended or adjusted under 35 U.S.C. 154(b) by 194 days.

(21) Appl. No.: 15/744,697

(22) PCT Filed: Jul. 14, 2016

(86) PCT No.: PCT/KR2016/007656  
§ 371 (c)(1),  
(2) Date: Jan. 12, 2018

(87) PCT Pub. No.: WO2017/010821  
PCT Pub. Date: Jan. 19, 2017

(65) Prior Publication Data  
US 2018/0203440 A1    Jul. 19, 2018

(30) Foreign Application Priority Data  
Jul. 15, 2015    (KR) .................. 10-2015-0100504

(51) Int. Cl.  
*G05B 23/02* (2006.01)  
*G05B 19/418* (2006.01)  
(Continued)

(52) U.S. Cl.  
CPC ......... *G05B 23/0259* (2013.01); *B62D 65/00* (2013.01); *G05B 19/4184* (2013.01); *G05B 23/0224* (2013.01); *B62D 65/18* (2013.01)

(58) Field of Classification Search  
CPC .... B62D 65/00; B62D 65/18; G05B 19/4184; G05B 23/0224; G05B 23/0259  
See application file for complete search history.

(56) References Cited

U.S. PATENT DOCUMENTS

| | | | |
|---|---|---|---|
| 6,801,821 B2* | 10/2004 | Madden ................. | B62D 65/02 700/101 |
| 7,069,100 B2* | 6/2006 | Monette ............. | G05B 19/4183 700/116 |
| 2007/0094859 A1* | 5/2007 | Lee ...................... | B23P 21/006 29/33 K |

FOREIGN PATENT DOCUMENTS

| | | |
|---|---|---|
| JP | 07041139 | 2/1995 |
| KR | 10-856301 | 7/2003 |

(Continued)

*Primary Examiner* — Elias Desta  
(74) *Attorney, Agent, or Firm* — Steven M. Shape; Dennemeyer & Associates, LLC

(57) ABSTRACT

A method for monitoring a driving unit of a car body assembly line, and a device therefor. The method includes: storing, for each driving unit, as initial data of the driving unit, information on time length, a peak current, an average current of a constant-speed section, and a current integral area in each sub section on the basis of a time-based current value measured in a normal state of the driving unit; storing, as observation data for each monitoring factor, information on the time length, the peak current, the average current of the constant-speed section, and the current integral area in each sub section, for each operating section observed during an operation of the driving unit; and individually comparing each piece of the information with a threshold level of the initial data, and providing state monitoring information of the driving unit, for each monitoring factor.

10 Claims, 9 Drawing Sheets

(51) Int. Cl.
    *B62D 65/00*    (2006.01)
    *B62D 65/18*    (2006.01)

(56) References Cited

FOREIGN PATENT DOCUMENTS

| KR | 10-2014-0081928 | 7/2014 |
| KR | 10-2015-0074258 | 7/2015 |

\* cited by examiner

METHOD FOR MONITORING DRIVING UNIT OF CAR BODY ASSEMBLY LINE, AND DEVICE THEREFOR

TECHNICAL FIELD

The present invention relates generally to a method for monitoring a driving unit of a car body assembly line, and a device therefor. More particularly, the present invention relates to a method for monitoring a driving unit of a car body assembly line, and a device therefor, wherein an operating state of a plurality of driving unit equipment is monitored in real time and thus predicting abnormality thereof.

BACKGROUND ART

In general, an automobile production process includes engine and transmission processes that completes a main body of an engine, a press process that forms an exterior shape of a car, a body process that completes a car body of a finished car by assembling and welding panels of each part of the car, a painting process for corrosion prevention and exterior treatment, and an assembly process that assembles interior and exterior parts into the finished car and finishes the assembly.

FIG. 1 is a view showing a general car assembly line. As shown in FIG. 1, a car assembly line has a transfer line provided along each process stage. On a rail installed along the transfer line, continuous transfer of the car body by a skid for car body transfer and reciprocating transfer of the car body by a hanger type of transfer device are performed in conjunction with each other, whereby a car body assembling process is performed as a continuous automation process.

For such a continuous automation process of the car body assembly, it is very important to stably operate a plurality of driving units (motors) necessary for operation of a plurality of skids for car body transfer and a plurality of hanger type transfer devices. The number of driving units used in a car body assembly plant varies depending on the size of the plant, but is about several hundred. Even when only one driving unit fails, the continuous automation process of the plant is stopped, resulting in enormous loss. When a downtime occurs due to a failure of the driving unit, it is expected to cause a business to incur significant losses in operating costs due to equipment downtime as well as in repair costs.

According to recent data from the Ministry of Employment and Labor and the Korea Occupational Safety & Health Agency, the number of victims of occupational accidents is about 100,000 per year, which is converted into a loss of 18 trillion won per year. In most factories and industrial sites, work overload causes mechanical failures, which leads to serious accidents such as fire, explosion, and leakage.

As a method for avoiding the cost of downtime due to such an unexpected failure of the driving unit equipment, it is urgent to introduce a predictive maintenance system. Although various efforts are already being undertaken in the name of predictive maintenance, development of higher-grade processes is required for more efficient predictive maintenance.

A conventional diagnosis technique of equipment such as a driving unit of an industrial facility includes vibration analysis, oil analysis, and the like. The oil analysis is a method of diagnosing equipment by analyzing the oil used in the equipment and checking the state of wear or deterioration, but is problematic in that accuracy is poor. The vibration analysis is a method of checking defects by detecting displacement and acceleration from vibration of each part of the equipment, but is problematic in that introduction cost is very high, and detect irregular fluctuation, fluctuation per second/per minute, and irregular vibration and fluctuation in vertical and horizontal directions are difficult to detect and real time measurement thereof are impossible.

Moreover, the vibration analysis is based on an expensive system with a basic cost of 200 to 300 million won for ten rotating machine sites. Since even one small plant usually requires hundreds of driving units, it costs billions of won and it is difficult to apply in the car body assembly plant. In addition, a professional engineer who can analyze FFT vibration analysis must be present all the time, which results in a labor cost problem.

The related art of the present invention is disclosed in Korean Patent Application Publication No. 2011-0072123 (published on Jun. 29, 2011)

DISCLOSURE

Technical Problem

Accordingly, the present invention has been made keeping in mind the above problems occurring in the prior art, and an object of the present invention is to provide a method for monitoring a driving unit of a car body assembly line, and a device therefor, wherein a condition of a plurality of driving unit equipment is efficiently monitored and diagnosed in a remote place at a cost less expensive than that of a conventional equipment diagnosis technique.

Technical Solution

In order to accomplish the above object, according to one aspect of the present invention, there is provided a method for monitoring a driving unit of a car body assembly line, the method monitoring a plurality of driving units in which operating and idle sections are repeatedly driven, and including: storing, for each driving unit, as initial data of the driving unit, information on time length of the operating section, a peak current of the operating section, an average current of a constant-speed section included in the operating section, and a current integral area in each sub section in which the operating section is divided, on the basis of a time-based current value measured in a normal state of the driving unit; storing, as observation data for each monitoring factor, information on the time length of the operating section, the peak current, the average current of the constant-speed section, and the current integral area in each sub section, for each operating section observed during an operation of the driving unit; and individually comparing each piece of the information of the observation data with a threshold level preset to correspond to each piece of the information of the initial data, and providing state monitoring information of the driving unit, for each monitoring factor.

Herein, the sub section may be obtained by dividing the operating section by a predetermined time unit in a time sequence, and a unique index (n=1, . . . , N) is given in the time sequence, and in the providing of the state monitoring information of the driving unit, in the case of the monitoring factor related to the current integral area, the current integral area in a nth sub section in the operating section may be compared with a threshold level corresponding to the current integral area in the nth sub section in the normal state, and when the current integral area in at least one sub section deviates from the corresponding threshold level, the monitoring factor related to the current integral area for the driving unit may be determined to be abnormal.

Further, in the providing of the state monitoring information of the driving unit, for each monitoring factor, the observation data corresponding to the monitoring factor may be compared with a preset multi-stage threshold level, a risk grade may be calculated differentially, alarm information corresponding to the calculated corresponding risk grade may be output, and the state monitoring information of the driving unit may be provided in the form of at least one of a text, a table, and a graph, wherein the state monitoring information on the driving unit selected from the plurality of driving units by a user terminal may be provided for each monitoring factor.

Further, in the providing of the state monitoring information of the driving unit, for the driving unit, the risk grade for the monitoring factor may be individually calculated as one of M number of risk grades, for each of a plurality of operating sections observed in a time sequence, and when it is confirmed that a mth risk grade for the monitoring factor is stored by a number equal to or greater than a reference number, the mth risk grade may be updated to a m+1th risk grade that is one grade higher than the mth risk grade and additional alarm information on the updated risk grade may be output.

Further, in the providing of the state monitoring information of the driving unit, a time-base current graph for the driving unit may be individually provided, and a current trend line may be provided together therewith by being displayed on the graph, the current trend line being formed by connecting points to each other corresponding to the peak currents or the average currents on a plurality of operating sections indicated in a time sequence.

Further, in the providing of the state monitoring information of the driving unit, positions of the plurality of driving units may be displayed on a layout diagram corresponding to the car body assembly line by associating icons of the driving units with unique codes of the driving units, and for each icon, an instantaneous current value of the a driving unit corresponding to the icon, a first lamp corresponding to a communication state of the corresponding driving unit, and a second lamp corresponding to a state monitoring result of the corresponding driving unit may be displayed, the second lamp displaying a first color as a representative state of the corresponding driving unit when all monitoring factors for the driving unit are all in a normal range, and displaying a second color as the representative state of the corresponding driving unit when at least one of all the monitoring factors deviates from the normal range.

According to another aspect of the present invention, there is provided a device for monitoring a driving unit of a car body assembly line, the device monitoring a plurality of driving units in which operating and idle sections are repeatedly driven, and including: an initial data storage unit storing, for each driving unit, as initial data of the driving unit, information on time length of the operating section, a peak current of the operating section, an average current of a constant-speed section included in the operating section, and a current integral area in each sub section in which the operating section is divided, on the basis of a time-based current value measured in a normal state of the driving unit; an observation data storage unit storing, as observation data for each monitoring factor, information on the time length of the operating section, the peak current, the average current of the constant-speed section, and the current integral area in each sub section, for each operating section observed during an operation of the driving unit; and a monitoring information providing unit individually comparing each piece of the information of the observation data with a threshold level preset to correspond to each piece of the information of the initial data, and providing state monitoring information of the driving unit, for each monitoring factor.

Advantageous Effects

As described above, according to the method for monitoring a driving unit of a car body assembly line, and the device therefor of the present invention, the operating state of a plurality of driving unit equipment positioned in a remote place is compared with the initial normal state, whereby the current state for the plurality of driving units can be monitored in real time and abnormality and malfunction thereof can be diagnosed in advance. In addition, the condition of the plurality of driving unit equipment in the remote place can be efficiently monitored and diagnosed at a cost less expensive than that of the conventional equipment diagnosis technique.

Further, according to the present invention, abnormality of each driving unit can be determined in advance before an occurrence of a major accident, and can be notified such that maintenance and parts replacement of the individual driving unit equipment can be enabled in a timely manner. In addition, the failure rate during a wear-out failure period can be dramatically reduced, and a problem attributable to installation failure at the time of early installation or demonstration of the driving unit can be prevented.

DESCRIPTION OF THE REFERENCE NUMERALS IN THE DRAWINGS

100: driving unit monitoring device
110: initial data storage unit
120: observation data storage unit
130: monitoring information providing unit

BEST MODE

The present invention implements a method for monitoring a driving unit of a car body assembly line, the method monitoring a plurality of driving units in which operating and idle sections are repeatedly driven, and including:

storing, for each driving unit, as initial data of the driving unit, information on time length of the operating section, a peak current of the operating section, an average current of a constant-speed section included in the operating section, and a current integral area in each sub section in which the operating section is divided, on the basis of a time-based current value measured in a normal state of the driving unit; storing, as observation data for each monitoring factor, information on the time length of the operating section, the peak current, the average current of the constant-speed section, and the current integral area in each sub section, for each operating section observed during an operation of the driving unit; and individually comparing each piece of the information of the observation data with a threshold level preset to correspond to each piece of the information of the initial data, and providing state monitoring information of the driving unit, for each monitoring factor.

MODE FOR INVENTION

Hereinbelow, exemplary embodiments of the present invention will be described in detail such that the invention can be easily embodied by those ordinarily skilled in the art to which this invention belongs.

The present invention relates to a device for monitoring a driving unit of a car body assembly line, which provides a method for real-time monitoring an operating state of a plurality of driving units (e.g. motors) necessary for a continuous automation process of a car body assembly, and diagnosing abnormality and malfunction of each driving unit in advance.

In general, various equipment installed in a plant produce a large amount of data in real time at any time, and such data includes valuable information used to directly or indirectly check the condition of the equipment.

In the embodiment of the present invention, a current value measured from each driving unit equipment is collected, and monitoring information such as an operating state of each driving unit is provided in real time on the basis of the collected current value. The driving unit equipment carries out the continuous automation process in the car body assembly line in which operating and idle sections are repeatedly driven. The operating and idle sections may be distinguished by the current value sensed in the driving unit equipment.

Figure 1:
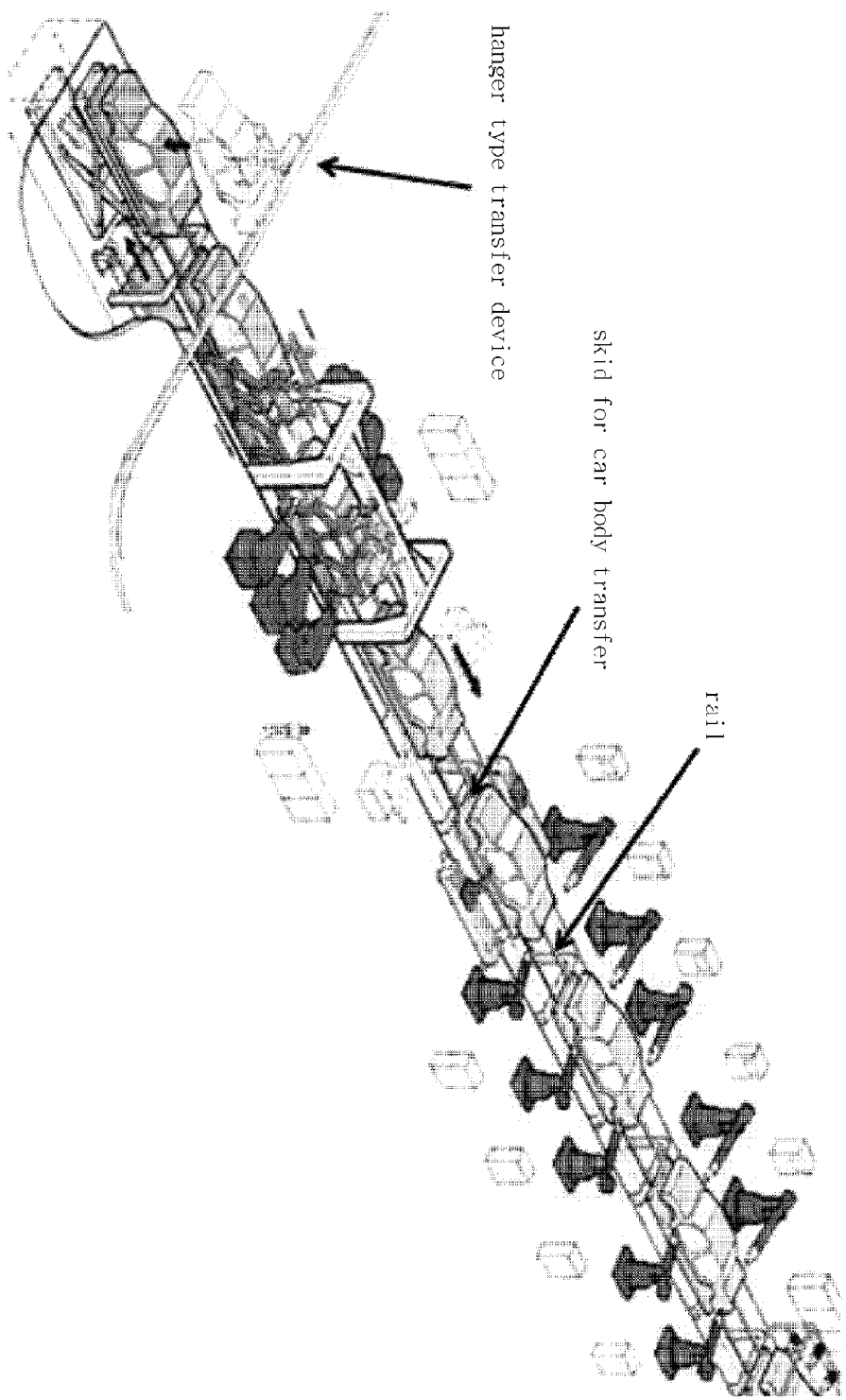
FIG. 1 is a view showing a general car assembly line.
Figure 2:
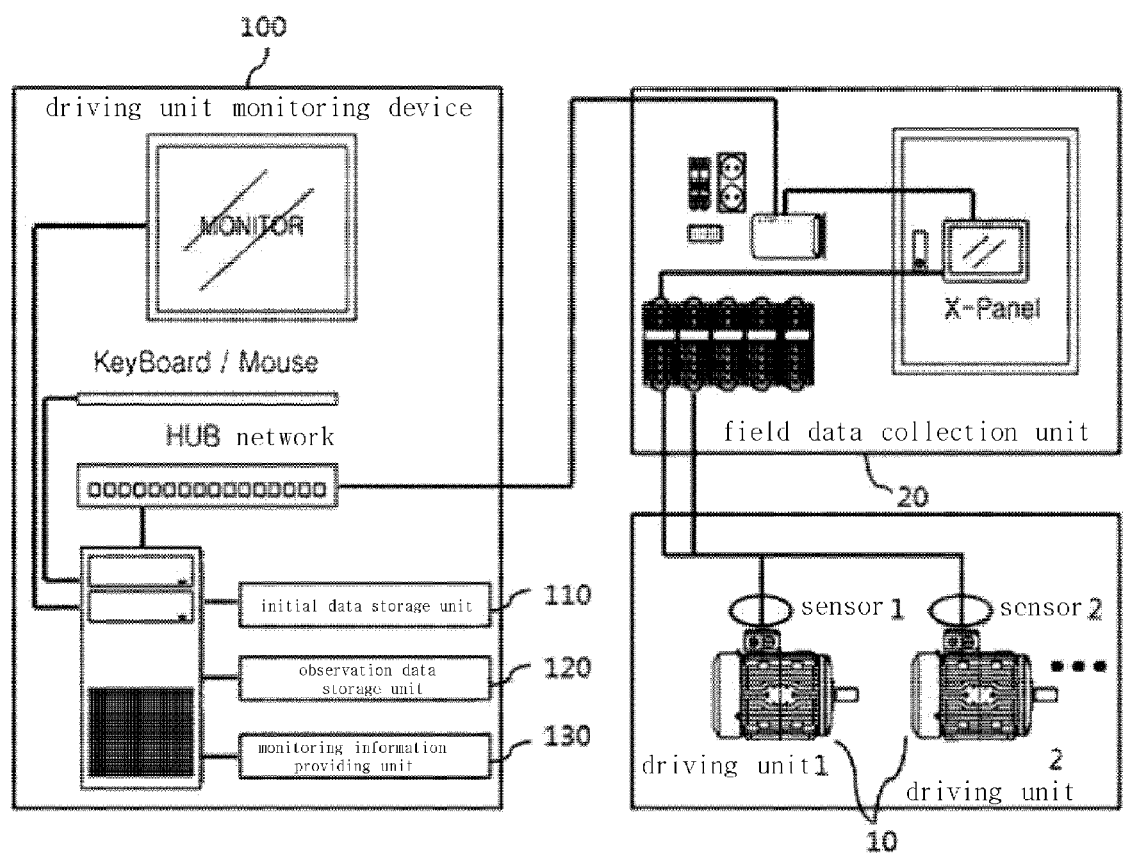
FIG. 2 is a block diagram showing a device for monitoring a driving unit of a car body assembly line according to an embodiment of the present invention.

FIG. 2 is a block diagram showing the device for monitoring the driving unit of the car body assembly line according to the embodiment of the present invention. A driving unit monitoring device 100 collects current values from a plurality of driving units 10 in real time during a car body assembly process. Each of the driving units 10 is provided with a sensor for sensing the current value, and sensing data is collected in a field data collection unit 20 and then transmitted to the driving unit monitoring device 100 via a communication network.

In the case of FIG. 2, the sensing data is transmitted by wire for convenience of explanation, but may be transmitted wirelessly. Further, in case of a wireless system, the sensing data may be transmitted wirelessly through an IoT-based RF sensor installed or mounted in each driving unit 10.

In the embodiment of the present invention, the driving unit monitoring device 100 may correspond to a management server, and provides monitoring status information, alarm information, and the like to a user (manager) through a display unit (monitor). In addition, the corresponding information may be provided to a user-authenticated user terminal (e.g. a PC, a notebook, a smart phone, and a smart device) in a wired or wireless manner.

The driving unit monitoring device 100 includes an initial data storage unit 110, an observation data storage unit 120, and a monitoring information providing unit 130.

The initial data storage unit 110 stores, for each driving unit 10, an initial data (time length of the operating section, a peak current of the operating section, an average current of a constant-speed section included in the operating section, and a current integral area in each sub section in which the operating section is divided), on the bases of a time-based current value measured in an initial normal state of the driving unit 10. The above-described four factors related to the initial data will be described in detail later.

In the embodiment of the present invention, the initial data is constructed individually for each driving unit because output may be different depending on the type of the driving unit, and a value corresponding to a normal range may be slightly different for each equipment even in the case of driving units of the same group. Of course, given that hundreds or more driving unit equipment are required in the car body assembly plant, the driving units of the same group may use in common initial data based on product's initial specification information or a current value obtained from one driving unit sample.

Figure 3:
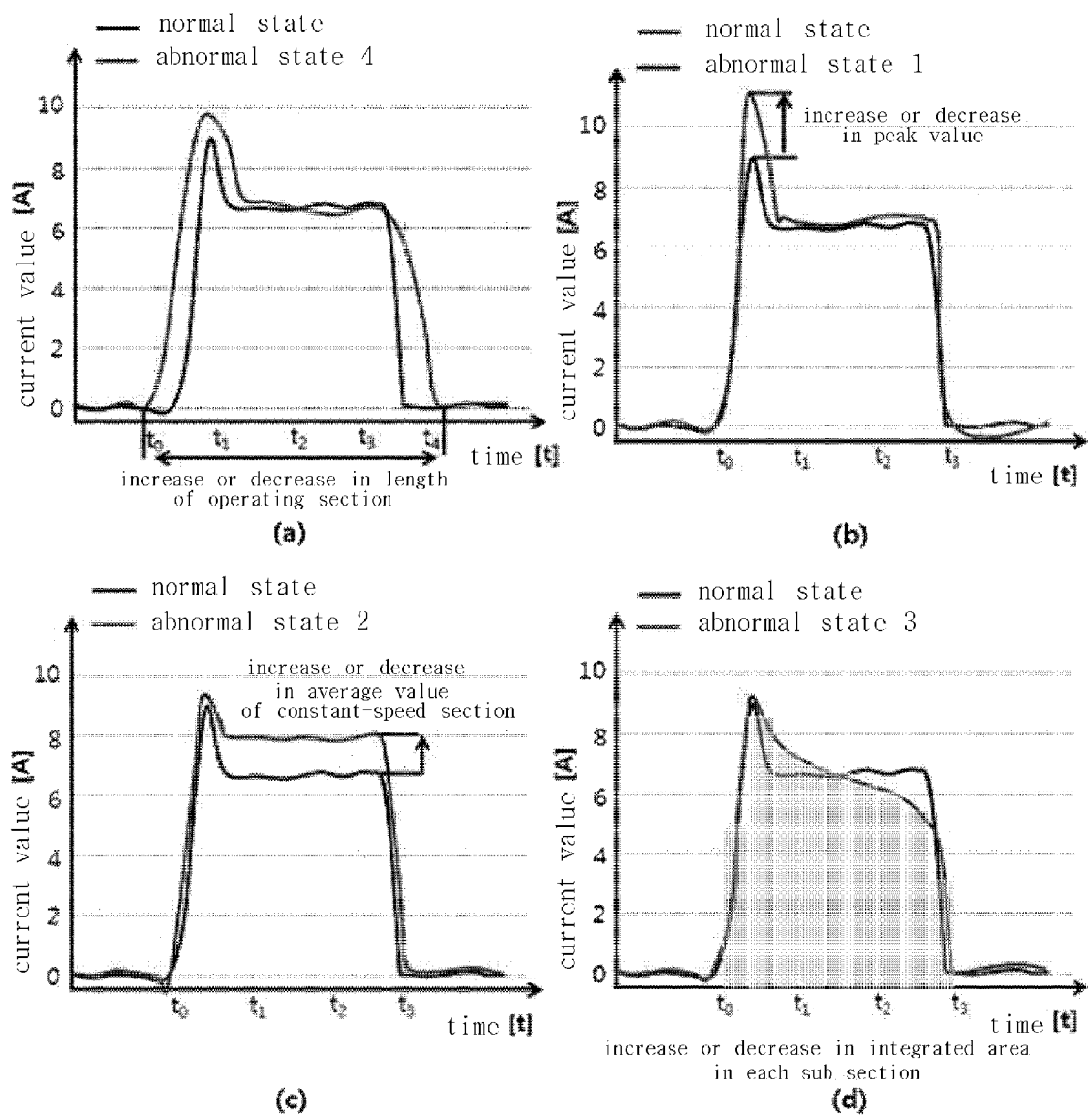
FIG. 3 is a view showing four monitoring factors used for monitoring the driving unit in the embodiment of the present invention.

FIG. 3 is a view showing the four monitoring factors used in driving unit monitoring in the embodiment of the present invention. FIGS. 3a to 3d respectively show measurement graphs of a current value (ordinate axis) as a function of time (abscissa axis) in a normal state and an abnormal state.

FIG. 3a is a graph showing the time length of the operating section. The time length of the operating section denotes the length between a starting point where the current value of the driving unit 10 increases equal to or greater than a reference value and an end point where the current value reaches less than the reference value. After the operating section, the idle section in which the current value maintains less than the reference value and the operating section repeat. FIG. 3a shows that the case where the time length of the operating section increases equal to or greater than a certain range on the basis of the normal state is the abnormal state. Of course, on the contrary, the case where the time length of the operating section decreases more than that in the normal state may also be the abnormal state.

FIG. 3b is a graph showing the peak current of the operating section, which shows that the case where the peak value increases equal to or greater than a certain range on the basis of the normal state is the abnormal state. Of course, on the contrary, the case where the peak value decreases may also be the abnormal state.

FIG. 3c is a graph showing the average current of the constant-speed section included in the operating section, which shows that the case where the average current of the constant-speed section increases equal to or greater than a certain range on the basis of the normal state is the abnormal state. Of course, on the contrary, the case where the average current of the constant-speed section decreases may also be the abnormal state. The constant-speed section of the driving unit (motor) denotes a stabilization section in which the current value becomes flat within an error range after an initial peak current.

FIG. 3d is a graph showing the current integral area in each sub section in which the operating section is divided by a predetermined time unit, which shows that a section from t0 to t3 is divided into nine sub sections for convenience of explanation. The sub sections are obtained by dividing the operating section by the predetermined time unit in a time sequence starting from a starting point of the operating section, and a unique index (n=1, ..., N) may be given in the time sequence. The current integral area denotes integral of the current value with the time.

Referring to two graphs shown, it can be seen that the operating sections remain the same in time length, but have deviations in the current integral area in each sub section. In the case of this embodiment, when a value of the current integral area for each sub section is individually compared with a value within a preset normal range of the corresponding sub section, and there is at least one sub section of which area increases or decrease equal to or greater than a certain area than the normal range, a monitoring factor related to the current integral area is determined to be in the abnormal state.

In this embodiment of the present invention, initial data corresponding to each monitoring factor is constructed for each driving unit 10 in advance. The initial data is used as a basis for setting a threshold level for determining the abnormal state of each factor. For example, an allowable normal range for upward and downward directions may be set on the basis of the peak current value of the initial normal state, and upper and lower limits of the normal range may be set to upper and lower threshold levels, respectively. In addition, a multi-stage threshold level in the upward or downward directions may be set depending on the degree of deviation from the upper or lower limit of the normal range. The threshold level may be manually set on the basis of information input by a user or may be set automatically in the system.

The observation data storage unit 120 stores, as observation data for each monitoring factor, information on the time length of the operating section, the peak current, the average current of the constant-speed section, and the current integral area in each sub section, for each operating section observed during operation of the driving unit 10. In other words, the observation data storage unit 120 stores, for each driving unit 10, the observation data for each monitoring factor on the basis of currently measured information in real time by acquiring the observation data for each operating section (cycle).

The monitoring information providing unit 130 individually compares each piece of the information of the observation data with a threshold level preset to correspond to each piece of the information of the initial data, and on the basis of the comparison result with each threshold level, provides state monitoring information of the driving unit 10, for each monitoring factor.

In other words, the monitoring information providing unit 130 compares the observation data with the initial data for each of the four monitoring factors, wherein the monitoring factor is compared with the threshold level for each factor determined by the initial data. For example, in the case of a peak current factor, a normal range may be determined in the upward and downward directions on the basis of the peak current of the initial normal state, and the multi-stage threshold level may be set depending on the degree of deviate from the normal range. Of course, upper and lower multi-stage threshold levels may be set, respectively, depending on the degree of deviation from the normal range to the upward and downward directions. There may be various variations on a method of setting the threshold level on the basis of the value in the normal state.

The monitoring information providing unit 130 may provide operating state monitoring information of each driving unit 10 in the form of a graph, a table, a text, etc., and may map monitoring information for each ID of each driving unit 10 and provide it.

Herein, the monitoring information provided for each driving unit may be stored in a separate information storage unit (not shown) such that individual history inquiry and management are possible. Such an information storage unit may be managed in the form of an integrated DB together with the data storage units 110 and 120. Of course, the integrated DB may store performance standard data and life cycle data that can be constructed on the basis of operating state information of the driving unit 10.

In addition, the present embodiment may include a predictive maintenance unit (not shown). The predictive maintenance unit provides performance standard data, life cycle data, and remaining service life data on the basis of the monitoring result of the driving unit 10, and notifies maintenance time and parts replacement time of the driving unit 10 on the basis of a caution or warning state, thereby increasing service life. Of course, the monitoring information providing unit 130 also provides the above-described predictive maintenance function.

Figure 4:
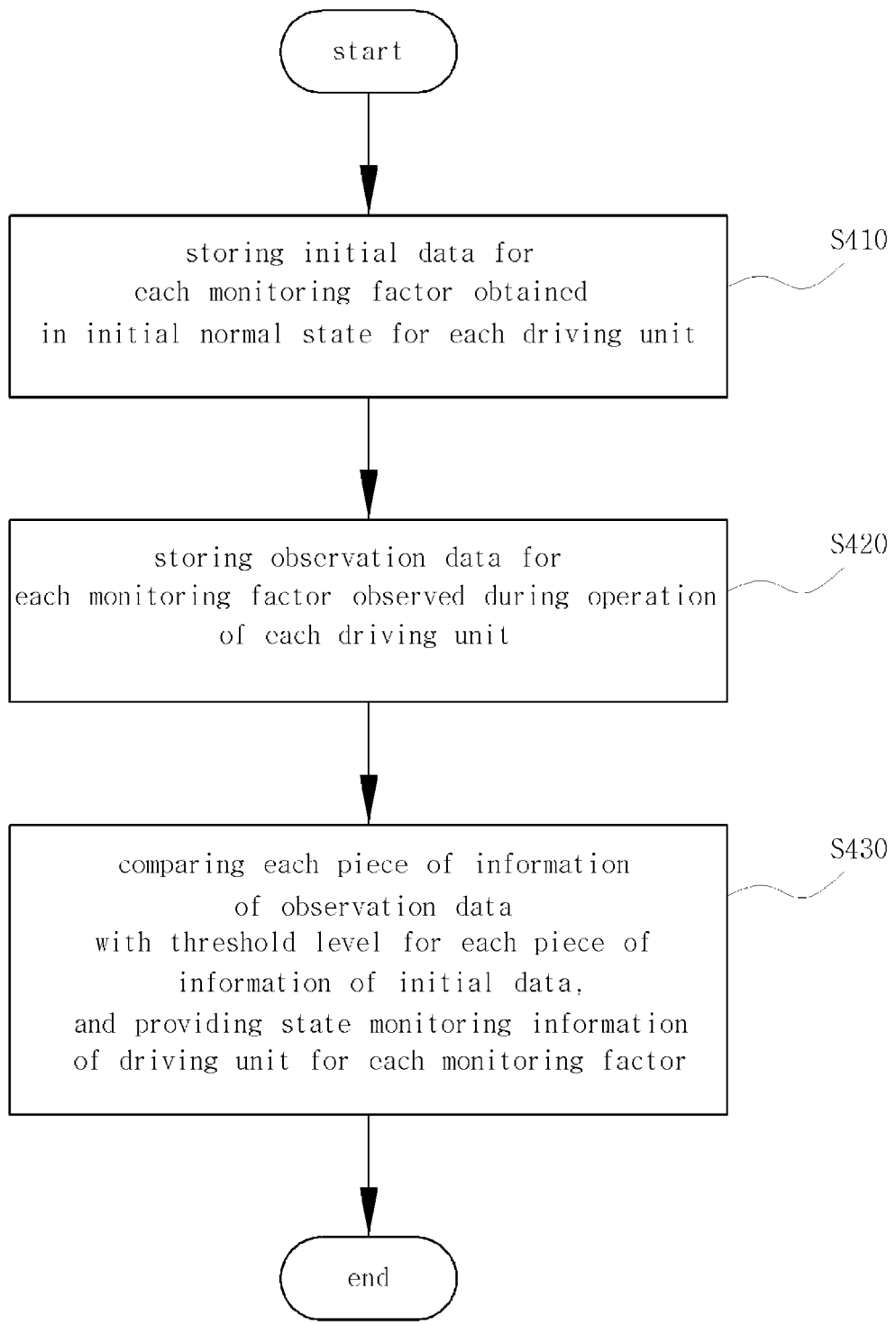
FIG. 4 is a flowchart showing a method for monitoring the driving unit using the device of FIG. 2.

Hereinafter, a method for monitoring a driving unit according to an embodiment of the present invention will be described in detail. FIG. 4 is a flowchart showing the method for monitoring the driving unit using the device of FIG. 2.

First, the initial data storage unit 110 confirms or calculates, for each driving unit 10, information on time length A of an operating section, a peak current B of the operating section, an average current C of a constant-speed section included in the operating section, and an current integral area D of currents in each sub section in which the operating section is divided, on the basis of a time-based current value measured in a normal state of the driving unit 10, and stores the information as initial data for each monitoring factor of the driving unit 10 (S410). Here, the definitions of the four monitoring factors (A to D) refer to the contents of FIG. 3 described above.

When the initial data is constructed as described above, observation data is obtained for each operation of the driving unit 10 thereafter. In other words, the observation data storage unit 120 stores, as observation data for each monitoring factor, the information on the time length A of the operating section, the peak current B, the average current C of the constant-speed section, and the current integral area D in each sub section, for each operating section observed during operation of the driving unit 10 (S420).

Thereafter, the monitoring information providing unit 130 individually compares each piece of the information of the observation data with each piece of the information of a threshold level preset to correspond to each piece of the information of the initial data, and based on this, provides state monitoring information of the driving unit 10, for each monitoring factor (S430).

Here, depending on a current state of the driving unit 10, all the monitoring factors may be in the normal state, all the monitoring factors may be in the abnormal state, or some monitoring factors may be in the abnormal state.

For example, in the step S430, the peak current of the driving unit 10 measured in a current cycle is compared with the threshold level (threshold peak current) obtained from the peak current of the initial normal state, and when it deviates from the threshold level, it is determined that the factor of the peak current in the current cycle is abnormal. Herein, depending on the degree of deviation, the abnormal state may be subdivided into states such as normal, caution, monitoring, warning, failure, etc.

In addition, the time length of the operating section measured in the current cycle of the driving unit 10 is compared with the threshold level (threshold time length) based on the data in the initial normal state, and when it does not deviate from the threshold level, the factor related to the time length of the operating section in the current cycle may be determined to be normal. The determination of the average current of the constant-speed section is performed according to the above principle.

Herein, the following method is used in the case of the monitoring factor related to the current integral area in each sub section. The operating section measured in the current cycle of the driving unit 10 is divided into a plurality of sub sections according to a predetermined time unit, and a unique index ($n=1, \ldots, N$) may be given thereto. Herein, it has been described that the sub section is a section obtained by dividing the operating section by a predetermined time unit in a time sequence as shown in FIG. 3$d$.

In the step S430, when the monitoring factor of the current integral area in each sub section is compared, the current integral area in a nth sub section in the operating section measured in the current cycle of the driving unit 10 is compared with the threshold level (threshold area) corresponding to the current integral area in the nth sub section in the initial normal state. Then, when the current integral area in at least one of total N number of sub sections deviates from the corresponding threshold level, the monitoring factor related to the current integral area in the current cycle may be determined to be abnormal.

Herein, when the factor of the time length of the operating section is abnormal, the number of sub sections divided may also increase or decrease more than that of the initial normal state. Accordingly, the factor of the current integral area in each sub section may also be determined to be abnormal.

Of course, when the average current of the constant-speed section is normal and the time length of the operating section does not change but the peak current greatly increases, the monitoring factor of the peak current is determined to be abnormal, while the monitoring factor of the current integral area may or may not be abnormal. This is because, even when the peak current deviates from the normal range, the area in the corresponding sub section may be calculated in the normal range. Herein, sensitivity of determination of whether or not it is normal may vary depending on the division length of the sub section. For example, in the case that the sub section is wide, the current integral area in the corresponding sub section may be determined to be normal even when the peak current temporarily deviates.

According to the embodiment of the present invention, during the operation of the driving unit, at least one of the four factors may be abnormal and two or more of the factors may be abnormal. In addition, as a result of observing one driving unit for each cycle, the number of factors in which the abnormal state occurs may be different for each cycle. This may be affected by temporary or long-term errors in the driving unit, ambient noise, equipment aging, and the like.

Hereinafter, the step of providing the monitoring information will be described in more detail.

The monitoring information providing unit 130 may compare, for each of the four monitoring factors, the observation data corresponding to the monitoring factor with the preset multi-stage threshold level (M number), calculate a risk grade differentially, and output alarm information corresponding to the calculated corresponding risk grade.

For example, the risk grade may be classified into a caution grade in which the observation data of a certain monitoring factor deviates from a first threshold level, a monitoring grade in which the observation data of the certain monitoring factor deviates from a second threshold level, a warning grade in which the observation data of the certain monitoring factor deviates from a third threshold level, and a failure grade in which the observation data of the certain monitoring factor deviates from a fourth threshold level, and the alarm information corresponding to each grade may be displayed on the display unit. Of course, such alarm information may be individually provided for each monitoring factor.

Herein, the monitoring information providing unit 130 provides the state monitoring information of each driving unit 10 in the form of at least one of a text, a table, and a graph, and may provide the state monitoring information of the driving unit 10 selected from the plurality of driving units 10 by a user terminal, for each monitoring factor. The user terminal may be a wired or wireless means connected to a management server 100, and may select a list of an object to inquiry from various driving unit lists.

Figure 5:
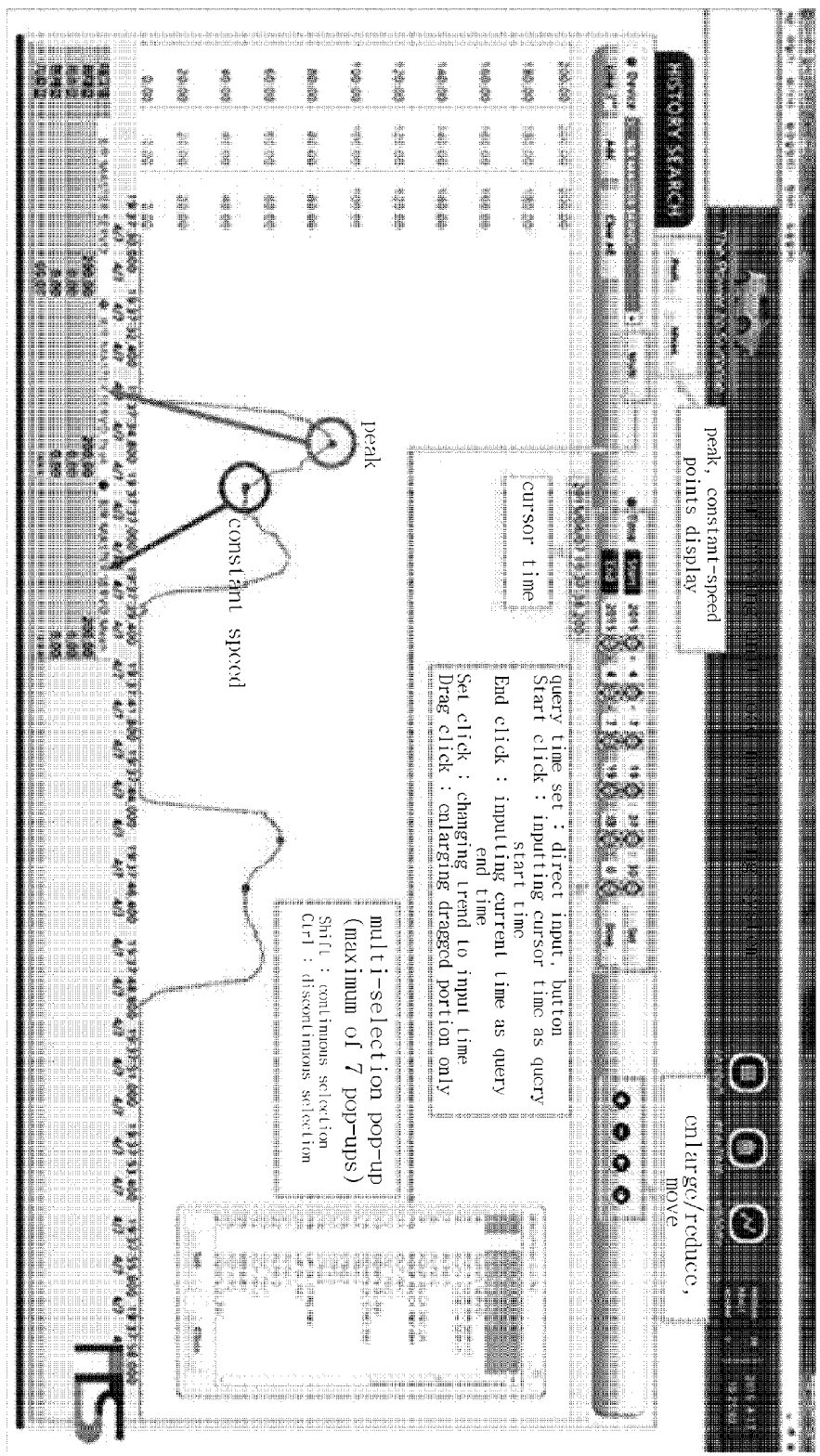
FIG. 5 is an exemplary view showing a screen for providing state monitoring information of the driving unit in the embodiment of the present invention.

FIG. 5 is an exemplary view showing a screen for providing the state monitoring information of the driving unit in the embodiment of the present invention. FIG. 5 shows the screen in which there is a combo box for equipment selection at the top left, and the driving unit equipment corresponding to B/R MASTER SERVO is selected by the user terminal from a plurality of available driving unit equipment lists and a real-time instantaneous current value therefor is provided.

Referring to FIG. 5, in the step S430, a peak point of the current value and a constant-speed point (an average current point of the constant-speed section or a starting point of the constant-speed section) can be tracked and displayed for each cycle. In addition, it is possible to set a query time for the currently selected driving unit, to inquire present and past data thereof, and to adjust the scale of the displayed graph through reduction or enlargement of screen size. Moreover, it is possible to provide a multi-selection pop-up function that allows multiple selections of the driving units monitored and individual simultaneous pop-ups thereof.

Of course, in addition to the above, in the step S430, it is possible to provide determination information for each monitoring factor, for each operating section of the driving unit 10. In other words, on the graph of FIG. 5, corresponding to a point of a certain operating section (cycle), information on the normal and abnormal states for each monitoring factor is provided in the form of a table or the like. For example, when a cursor moves into the point of the certain cycle, the corresponding information may be automatically exposed, and when the cursor moves out of the point, the information may disappear again.

In addition, in step S430, the monitoring information providing unit 130 individually provides a time-based current graph for the driving units 10, and a current trend line may be provided together therewith by being displayed on the graph in the form of a broken line or the like, the current trend line being formed by connecting points to each other corresponding to the peak currents or the average currents on a plurality of operating sections (cycles) indicated in a time sequence. Thus, it is possible to easily confirm a time course of the peak current and the average current.

Meanwhile, the monitoring information providing unit 130 may accumulate the risk grade of the monitoring factors determined for each cycle of the driving unit 10, and reproduce alarm information based on this. This will be described in detail as follows.

The monitoring information providing unit 130 individually calculates and stores, for the driving unit 10, the risk grade for the monitoring factors as one of the M number of risk grades for each of the plurality of operating sections (cycles) observed in a time sequence. For example, for one driving unit, the risk grade is calculated for each monitoring factor in a first cycle, and the risk grade is calculated for each monitoring factor in a second cycle, which is repeatedly performed in each subsequent cycle and the result is stored (accumulated). When the peak current monitoring factor is determined to be caution, caution, and caution grades during the first to third cycles, respectively, the caution grade of the peak current is accumulated three times.

Then, when it is confirmed that a mth risk grade for the corresponding monitoring factor is stored equal to or greater than a reference number, the monitoring information providing unit 130 updates the risk grade to a m+1th risk grade, which is one grade higher than the mth risk grade, and outputs additional alarm information on the updated risk grade. For example, when for the monitoring factor of the peak current, the caution grade is accumulated equal to or greater than ten times, even though the determination result in the recent cycle is the caution grade, the result may be provided indicating that the monitoring factor of the peak current for the corresponding driving unit is raised to the monitoring grade rather than being the caution grade. Of course, in addition to the above, the determination result (caution grade) in the recent cycle and the determination result (monitoring grade) based on the cumulative number may be provided at the same time.

Figure 6:
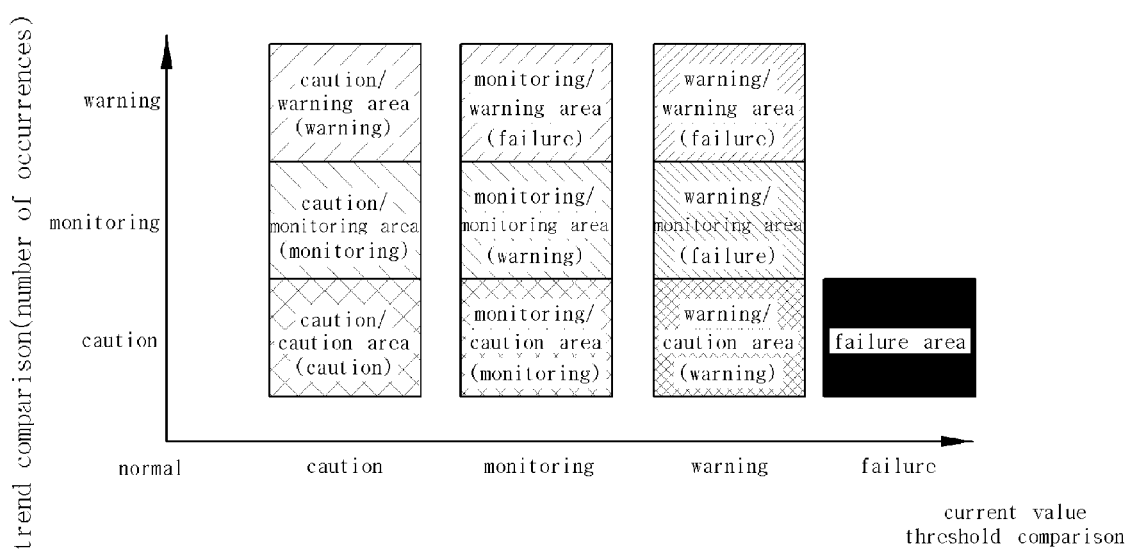
FIG. 6 is a view showing a diagnostic graph according to the number of occurrences by a risk grade of the driving unit in the embodiment of the present invention.

FIG. 6 is a view showing a diagnostic graph according to the number of occurrences by the risk grade of the driving unit in the embodiment of the present invention. For convenience of explanation, it is assumed that FIG. 6 is based on the cumulative number of individual risk grades obtained by comparing the factors of the peak currents for the respective cycles with the respective threshold levels.

In general, abnormality diagnosis for the driving units is performed by comparing a normal-state current with a real time current. Each cycle generates a signal of the corresponding risk grade and counts the cumulative number of occurrences by a statistical process control (SPC). Herein, the number of occurrences of the corresponding risk grade is compared with the threshold number (reference number), and when the number of occurrences is equal to or greater than the threshold number, the risk grade may be updated. Herein, for each grade, the threshold number compared may be set to be different.

As described above, in the embodiment of the present invention, it is possible to provide simply the diagnosis result of the abnormal state for each cycle, and it is also possible to provide, as the additional alarm information, the information of the abnormal state based on the number of times, on the basis of the risk grade that has been accumulated until recently for each cycle. Of course, when it is confirmed that as a result of monitoring again after a certain time, a normal grade is accumulated equal to or greater than the threshold number on the basis of a time point of a grade raise, the corresponding monitoring factor may be restored to the caution or normal grade again.

The additional alarm function based on the cumulative number of the risk grades can be associated with Heinrich's Law. Heinrich's Law states that there are 25 minor accidents before any major accident, and there are more than 300 anomalous signs before the 25 accidents. In the embodiment of the present invention, the problem measured for each monitoring factor is detected and notified in advance, and the detection number thereof is accumulated to be additionally notified and managed. Accordingly, before any major accident occurs, proactive measures (e.g. maintenance, replacement) for the driving unit equipment can be induced to be performed.

Figure 7:
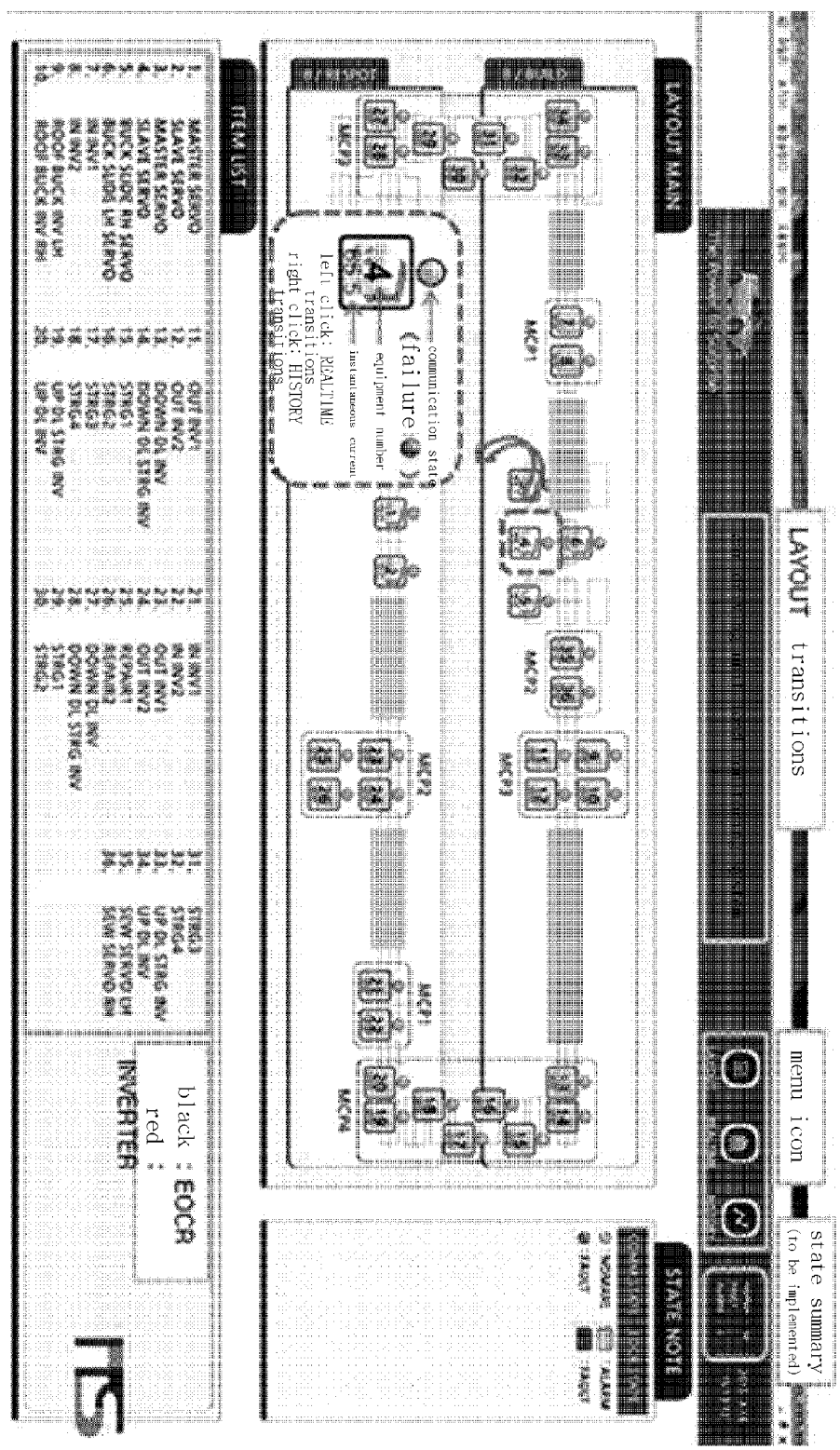
FIG. 7 is an exemplary view showing a display screen according to the embodiment of the present invention.

FIG. 7 is an exemplary view showing a display screen according to the embodiment of the present invention. Referring to FIG. 7, the monitoring information providing unit 130 displays, on a layout diagram corresponding to the car body assembly line, positions of the plurality of driving units 10 by associating icons corresponding to the driving units 10 with unique codes of the driving units 10. In addition, as shown in the lower side of the drawing, the unique codes (ID) for the respective driving units 10 are matched with the actual names, and which are represented as a driving unit list.

Further, FIG. 7 shows that the monitoring information providing unit 130 displays, for each icon of the driving units 10, an instantaneous current value of a driving unit 10 corresponding to the icon, a first lamp corresponding to a communication state of the corresponding driving unit 10, and a second lamp corresponding to a state monitoring result of the corresponding driving unit 10.

Here, the second lamp may be driven by changing color of the icon (square shape) of the driving unit itself. In addition, the second lamp may display a first color (e.g. white) as a representative state of the corresponding driving unit when all the monitoring factors for the driving unit 10 are all in the normal range, and may display a second color (e.g. red) as the representative state of the corresponding driving unit when at least one of all the monitoring factors deviates from the normal range. Herein, the color of the most abnormal state may be displayed as the representative state by using orange, red, or the like depending on the degree of deviate from the normal range.

According to the above-described configuration, it is possible to enable both the positions and the state information of the respective driving units to be intuitively confirmed on the entire layout screen in the field, and it is possible to easily identify the driving unit that requires maintenance or replacement work.

In the embodiment of the present invention, in addition to the above, the monitoring information providing unit 130 may generate an alarm for the corresponding driving unit 10 when the width of an increase in the current value is equal to or greater than a reference width for a set time. This is because the rapid increase in the current value to more than the limit width is more likely to occur due to a risky accident.

Moreover, it is possible to determine the operation and idle sections from the time-based current value, thereby measuring the required work time in the car body assembly process. In general, the required work time in the car body assembly process is directly related to a unit per hour (UPH) of the assembly line. Thus, it is required to measure the required work time of the assembly process at the time of new construction and refurbishment of the car body assembly line. When the operation time of the driving units 10 required for the continuous automation process is checked in real time, the required work time of the assembly line can be accurately measured.

Figure 8:
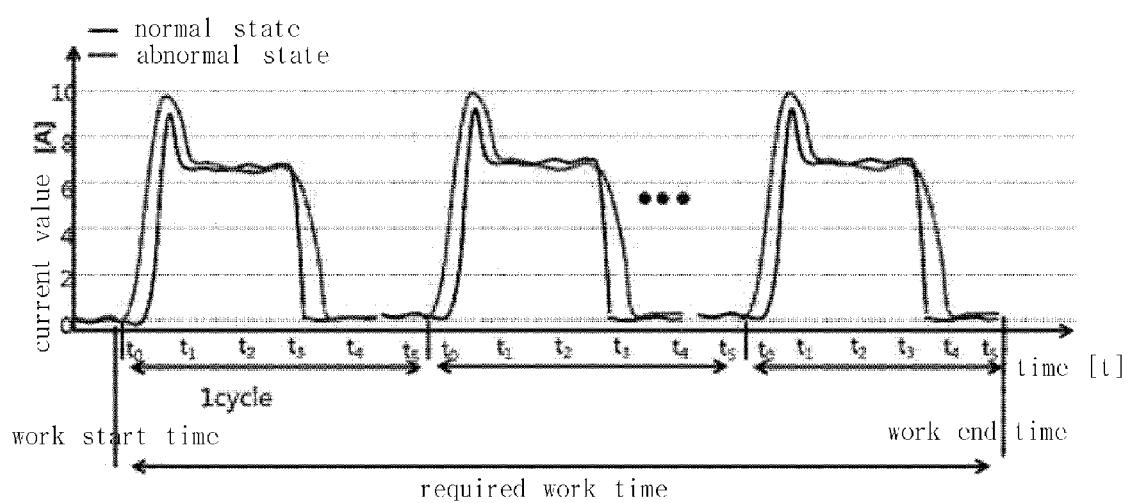
FIG. 8 is a conceptual view showing a method of measuring required work time using the embodiment of the present invention.

FIG. 8 is a conceptual view showing a method for measuring the required work time using the embodiment of the present invention. When a work start signal of the car body assembly line is input to the driving unit 10, the driving unit 10 operates a work start time timer and operates a program for accumulating the work time. A section between a starting point of the operation of the driving unit 10 and a starting point of the next operation is defined as one cycle.

This one cycle represents time required for an operator to perform one unit of work at normal working speed while maintaining quality conditions under normal working environment and conditions. Measurement time data accumulated until work end is recorded in a work time memory device of the corresponding process. In the case of FIG. 8, for convenience of explanation, only a total of three cycles before the work end are shown.

In general, as service life of the driving unit 10 is reduced, wear-out failure occurs rapidly, and an operation current value of the driving unit 10 slowly increases or decreases. Thus, it may be determined that when a one cycle time of the driving unit, total required work time, and time to reach the constant-speed section (change in inclination) increase, the driving unit 10 is in the abnormal state.

As described above, in the embodiment of the present invention, it is possible to provide a method of measuring the required work time of the car body assembly line as well as a predictive maintenance method of determining the operating state of the driving unit 10. In addition, it is possible to check the start and end of work in real time in a remote place, to automatically accumulate the required work time, to store it in the database, and to analyze one cycle time and the total required work time by a computer every day. Accordingly, it is possible to confirm unit per hour of the assembly line, and based on this, to find a method of improving unit per hour.

Figure 9:
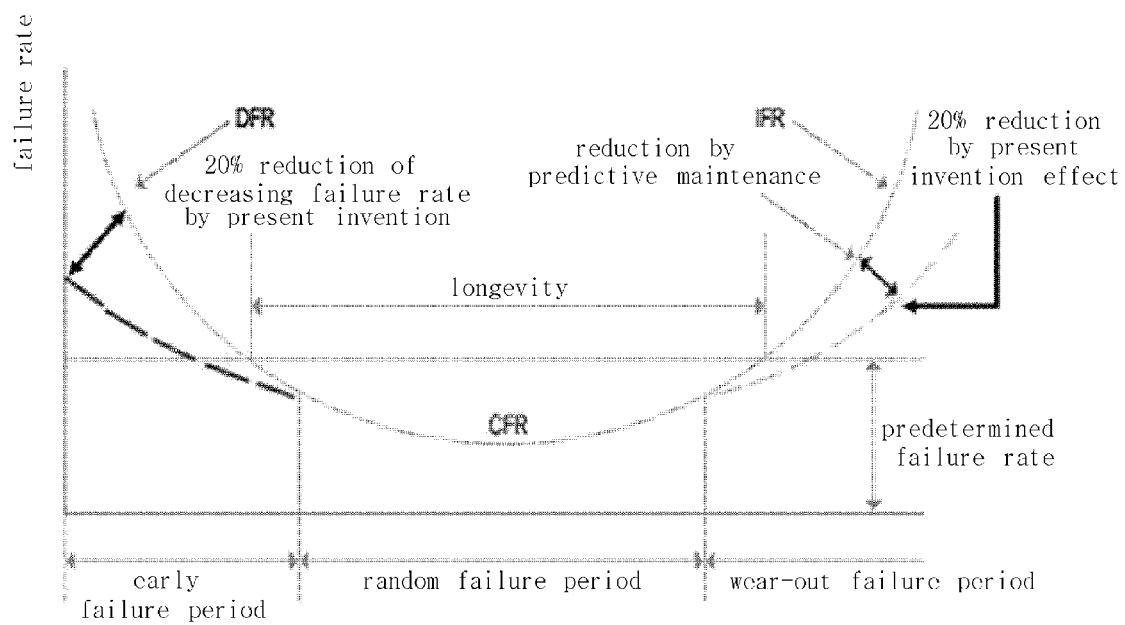
FIG. 9 is a graph showing a failure occurrence cycle of the driving unit according to the embodiment of the present invention.

FIG. 9 is a graph showing a failure occurrence cycle of the driving unit according to the embodiment of the present invention. FIG. 9 shows a combination of three basic types of failure rates: Decreasing Failure Rate (DFR), Constant Failure Rate (CFR), and Increment Failure Rate (IFR). In general, machines are frequently broken due to installation failure at the time of early installation, but are gradually stabled after operation, and then wear-out failure occurs rapidly as service life is expanded.

In the embodiment of the present invention, it is possible to recognize or predict in advance a problem such as a failure and to establish an appropriate maintenance plan at a point where the wear-out failure rapidly increases. Accordingly, it is possible to enable machine maintenance and parts replacement in a timely manner, thereby realizing dramatically reduced failure rate during a wear-out failure period, and reducing problems attributable to early installation failure. According to the embodiment of the present invention, each of the failure rate attributable to the early installation failure and the failure rate attributable to subsequent wear-out failure can be reduced by 20%, thereby reducing a total failure rate by equal to or greater than 40%.

According to the method for monitoring the driving unit of the car body assembly line and the device therefor according to the present invention as described above, the operating state of the plurality of driving unit equipment positioned in a remote place is compared with the initial normal state, whereby the current state for the plurality of driving units can be monitored in real time and abnormality and malfunction thereof can be diagnosed in advance. Further, the condition of the plurality of driving unit equipment in the remote place can be efficiently monitored and diagnosed at a cost of 40 times (4,000%) less expensive than that of a conventional equipment diagnosis technique.

In addition, according to the present invention, abnormality of each driving unit can be determined in advance before an occurrence of a major accident, and can be notified such that maintenance and parts replacement of the individual driving unit equipment can be enabled in a timely manner. The failure rate during the wear-out failure period can be dramatically reduced, and the problem attributable to the installation failure at the time of the early installation or demonstration of the driving unit can be prevented.

Moreover, according to the present invention, a maximum of 400 driving unit information per one data record can be simultaneously processed at a high speed of 30 mmsec, thereby constructing a database that is 100 times more effective than vibration analysis. Thus, it is possible to establish the appropriate maintenance plan by identifying a driving status of the driving units in the industrial facility in daily life, and detecting and complementing the abnormality of the driving units in advance. In addition, it is possible to prevent line stopping, thereby minimizing economic loss and life loss, and to ensure an improvement in utilization rate of the driving units in the industrial facility, thereby achieving a maximized economic benefit.

While the present invention has been particularly shown and described with reference to exemplary embodiments thereof, it will be understood by those of ordinary skill in the art that various changes and modifications may be made therein without departing from the technical idea and scope of the present invention and such changes and modifications belong to the claims of the present invention.

The invention claimed is:

1. A method for monitoring a driving unit of a car body assembly line, the method monitoring a plurality of driving units in which operating and idle sections are repeatedly driven, the method comprising:

storing, for each driving unit, as initial data of the driving unit, information on time length of the operating section, a peak current of the operating section, an average current of a constant-speed section included in the operating section, and a current integral area in each sub section in which the operating section is divided, on the basis of a time-based current value measured in a normal state of the driving unit;

storing, as observation data for each monitoring factor, information on the time length of the operating section, the peak current, the average current of the constant-speed section, and the current integral area in each sub section, for each operating section observed during an operation of the driving unit; and individually comparing each piece of the information of the observation data with a threshold level preset to correspond to each piece of the information of the initial data, and providing state monitoring information of the driving unit, for each monitoring factor.

2. The method of claim 1, wherein the sub section is obtained by dividing the operating section by a predetermined time unit in a time sequence, and a unique index (n=1, . . . , N, where n, N are integers) is given in the time sequence, and in the providing of the state monitoring information of the driving unit, in the case of the monitoring factor related to the current integral area, the current integral area in a nth sub section in the operating section is compared with a threshold level corresponding to the current integral area in the nth sub section in the normal state, and when the current integral area in at least one sub section deviates from the corresponding threshold level, the monitoring factor related to the current integral area for the driving unit is determined to be abnormal.

3. The method of claim 1, wherein in the providing of the state monitoring information of the driving unit, for each monitoring factor, the observation data corresponding to the monitoring factor is compared with a preset multi-stage threshold level, a risk grade is calculated differentially, alarm information corresponding to the calculated corresponding risk grade is output, and the state monitoring information of the driving unit is provided in the form of at least one of a text, a table, and a graph, wherein the state monitoring information on the driving unit selected from the plurality of driving units by a user terminal is provided for each monitoring factor.

4. The method of claim 3, wherein in the providing of the state monitoring information of the driving unit, for the driving unit, the risk grade for the monitoring factor is individually calculated as one of M number of risk grades, for each of a plurality of operating sections observed in a time sequence, and when it is confirmed that a mth (where m, M are integers) risk grade for the monitoring factor is stored by a number equal to or greater than a reference number, the mth risk grade is updated to a m+1th risk grade that is one grade higher than the mth risk grade and additional alarm information on the updated risk grade is output.

5. The method of claim 3, wherein in the providing of the state monitoring information of the driving unit, a time-base current graph for the driving unit is individually provided, and a current trend line is provided together therewith by being displayed on the graph, the current trend line being formed by connecting points to each other corresponding to the peak currents or the average currents on a plurality of operating sections indicated in a time sequence.

6. The method of claim 1, wherein in the providing of the state monitoring information of the driving unit, positions of the plurality of driving units are displayed on a layout diagram corresponding to the car body assembly line by associating icons of the driving units with unique codes of the driving units, and for each icon, an instantaneous current value of a driving unit corresponding to the icon, a first lamp corresponding to a communication state of the corresponding driving unit, and a second lamp corresponding to a state monitoring result of the corresponding driving unit are displayed, the second lamp displaying a first color as a representative state of the corresponding driving unit when all monitoring factors for the driving unit are all in a normal range, and displaying a second color as the representative state of the corresponding driving unit when at least one of all the monitoring factors deviates from the normal range.

7. A device for monitoring a driving unit of a car body assembly line, the device monitoring a plurality of driving units in which operating and idle sections are repeatedly driven, the device comprising:

an initial data storage unit storing, for each driving unit, as initial data of the driving unit, information on time length of the operating section, a peak current of the operating section, an average current of a constant-speed section included in the operating section, and a current integral area in each sub section in which the operating section is divided, on the basis of a time-based current value measured in a normal state of the driving unit;

an observation data storage unit storing, as observation data for each monitoring factor, information on the time length of the operating section, the peak current, the average current of the constant-speed section, and the current integral area in each sub section, for each operating section observed during an operation of the driving unit; and a monitoring information providing unit individually comparing each piece of the information of the observation data with a threshold level preset to correspond to each piece of the information of the initial data, and providing state monitoring information of the driving unit, for each monitoring factor.

8. The device of claim 7, wherein the sub section is obtained by dividing the operating section by a predetermined time unit in a time sequence, and a unique index (n=1, . . . , N, where n, N are integers) is given in the time sequence, and in the case of the monitoring factor related to the current integral area, the monitoring information providing unit compares the current integral area in a nth sub section in the operating section with a threshold level corresponding to the current integral area in the nth sub section in the normal state, and when the current integral area in at least one sub section deviates from the corresponding threshold level, the monitoring information providing unit determines that the monitoring factor related to the current integral area for the driving unit is abnormal.

9. The device of claim 7, wherein the monitoring information providing unit, for each monitoring factor, compares the observation data corresponding to the monitoring factor with a preset multi-stage threshold level, calculates a risk grade differentially, outputs alarm information corresponding to the calculated corresponding risk grade, and provides the state monitoring information of the driving unit in the form of at least one of a text, a table, and a graph, wherein the state monitoring information on the driving unit selected from the plurality of driving units by a user terminal is provided for each monitoring factor.

10. The device of claim 9, wherein the monitoring information providing unit, for the driving unit, individually calculates the risk grade for the monitoring factor as one of M number of risk grades, for each of a plurality of operating sections observed in a time sequence, and when it is confirmed that a mth (where m, M are integers) risk grade for the monitoring factor is stored by a number equal to or greater than a reference number, the monitoring information providing unit updates the mth risk grade to a m+1th risk grade that is one grade higher than the mth risk grade and outputs additional alarm information on the updated risk grade.

* * * * *